(12) United States Patent
Iwata et al.

(10) Patent No.: US 11,245,276 B2
(45) Date of Patent: Feb. 8, 2022

(54) PORTABLE TERMINAL CHARGING STAND

(71) Applicant: NEC Platforms, Ltd., Kawasaki (JP)

(72) Inventors: Akihisa Iwata, Kanagawa (JP);
Katsutoshi Hayashi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/975,571

(22) PCT Filed: Feb. 13, 2019

(86) PCT No.: PCT/JP2019/004961
§ 371 (c)(1),
(2) Date: Aug. 25, 2020

(87) PCT Pub. No.: WO2019/163591
PCT Pub. Date: Aug. 29, 2019

(65) Prior Publication Data
US 2020/0403427 A1 Dec. 24, 2020

(30) Foreign Application Priority Data
Feb. 26, 2018 (JP) .............................. JP2018-031878

(51) Int. Cl.
*H01M 10/46* (2006.01)
*H02J 7/00* (2006.01)
*H02J 7/02* (2016.01)

(52) U.S. Cl.
CPC .............. *H02J 7/0045* (2013.01); *H02J 7/02* (2013.01)

(58) Field of Classification Search
CPC ...... H02J 7/0045; H02J 7/0042; H02J 7/0044; H02J 7/0013; H02J 7/02; H04B 1/3888
(Continued)

(56) References Cited

U.S. PATENT DOCUMENTS

| 2012/0257342 A1 | 10/2012 | Shindo et al. |
| 2018/0212638 A1 | 7/2018 | Iwata et al. |
| 2019/0166240 A1 | 5/2019 | Hayahi et al. |

FOREIGN PATENT DOCUMENTS

| CA | 2639446 A1 * | 3/2009 | ............ H02J 7/0044 |
| JP | S53-087026 U | 7/1978 | |

(Continued)

OTHER PUBLICATIONS

International Search Report for PCT Application No. PCT/JP2019/004961, dated May 7, 2019.
(Continued)

*Primary Examiner* — Edward Tso
(74) *Attorney, Agent, or Firm* — Sughrue Mion, PLLC

(57) ABSTRACT

Provided is a charge base for mounting a portable terminal having a shoulder belt and for charging the mounted portable terminal. The portable terminal charge base comprises: a base portion; a terminal accommodating portion which is disposed over and to the front of the base portion, has a groove shape extending in a width direction W of the base portion, and accommodates a lower part of the portable terminal; a shoulder belt accommodating portion which is disposed to the rear of the terminal accommodating portion over the base portion, has a groove shape extending in the width direction, and accommodates at least a part of the shoulder belt of the portable terminal mounted to the terminal accommodating portion; and a contact pin which is disposed in the terminal accommodating portion and electrically connects with a charge terminal provided in the portable terminal accommodated in the terminal accommodating portion.

20 Claims, 17 Drawing Sheets

(58) Field of Classification Search
USPC .............. 320/107, 111, 114, 115; 455/575.1, 455/575.8
See application file for complete search history.

(56) References Cited

FOREIGN PATENT DOCUMENTS

| JP | S59-060835 U | 4/1984 | |
|----|----|----|----|
| JP | H09-260003 A | 10/1997 | |
| JP | 2007-060823 A | 3/2007 | |
| JP | 2011-107991 A | 6/2011 | |
| JP | 2012-226733 A | 11/2012 | |
| JP | 6198093 B1 | 9/2017 | |
| JP | 2018-023281 A | 2/2018 | |
| JP | 6315639 B1 | 4/2018 | |
| WO | 2009/047769 A2 | 4/2009 | |
| WO | WO-2017039191 A1 * | 3/2017 | ................ H02J 7/02 |
| WO | WO-2018163760 A1 * | 9/2018 | ............ H02J 7/0027 |

OTHER PUBLICATIONS

English translation of Written opinion for PCT Application No. PCT/JP2019/004961, dated May 7, 2019.
Japanese Office Action for JP Application No. 2018-031878 dated Apr. 24, 2019 with English Translation.
Japanese Office Action for JP Application No. 2018-031878 dated Nov. 13, 2019 with English Translation.

* cited by examiner

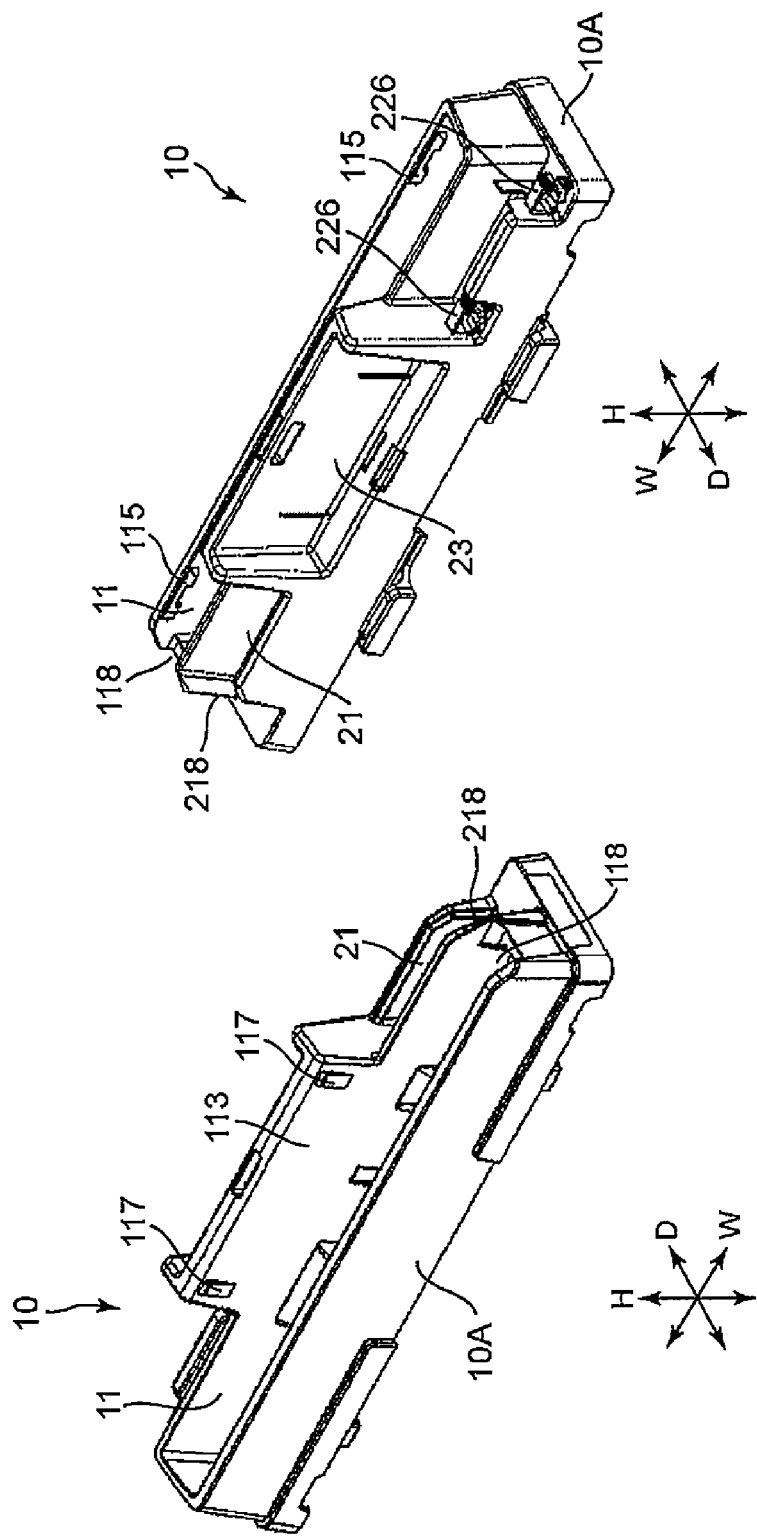

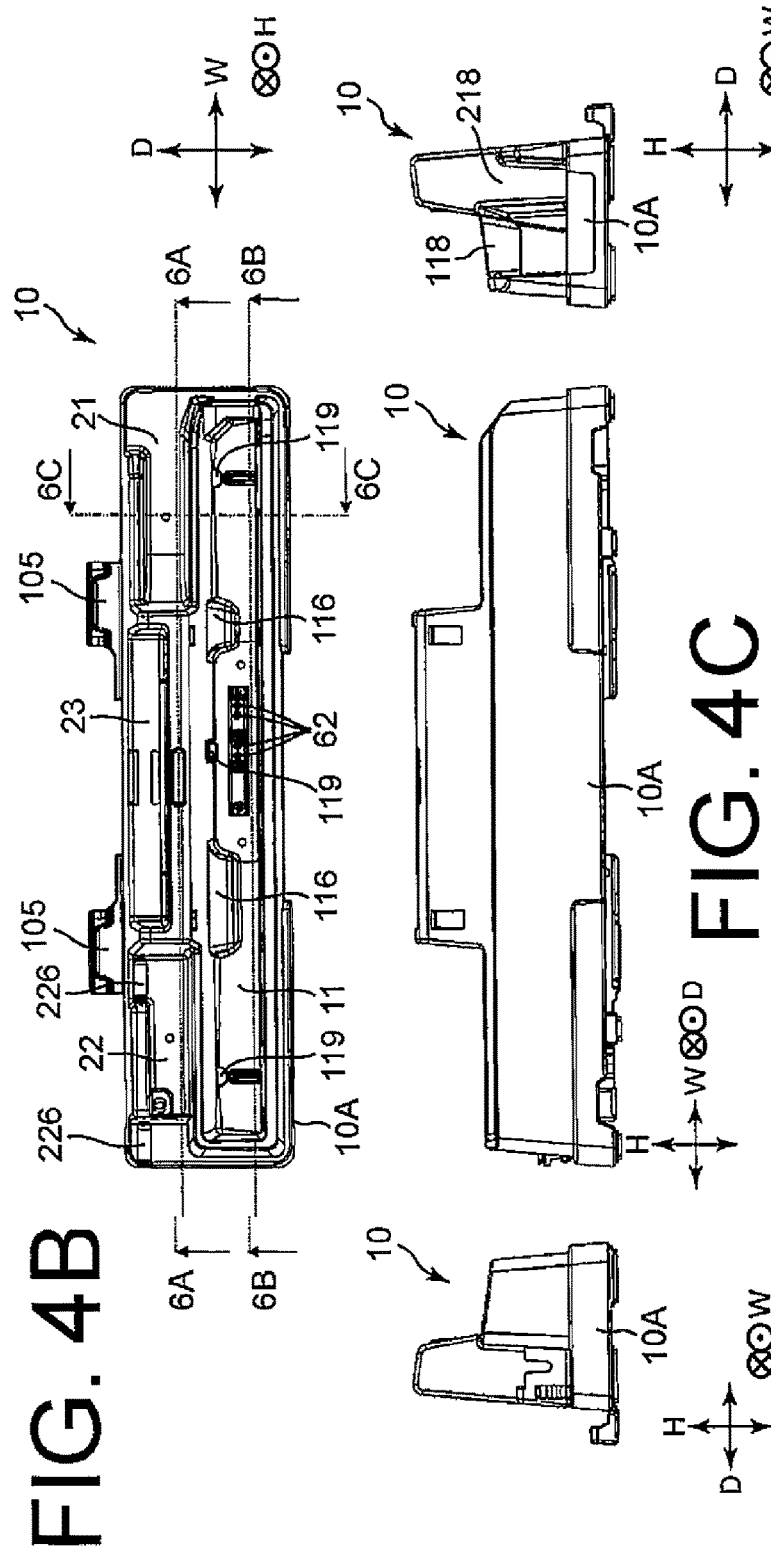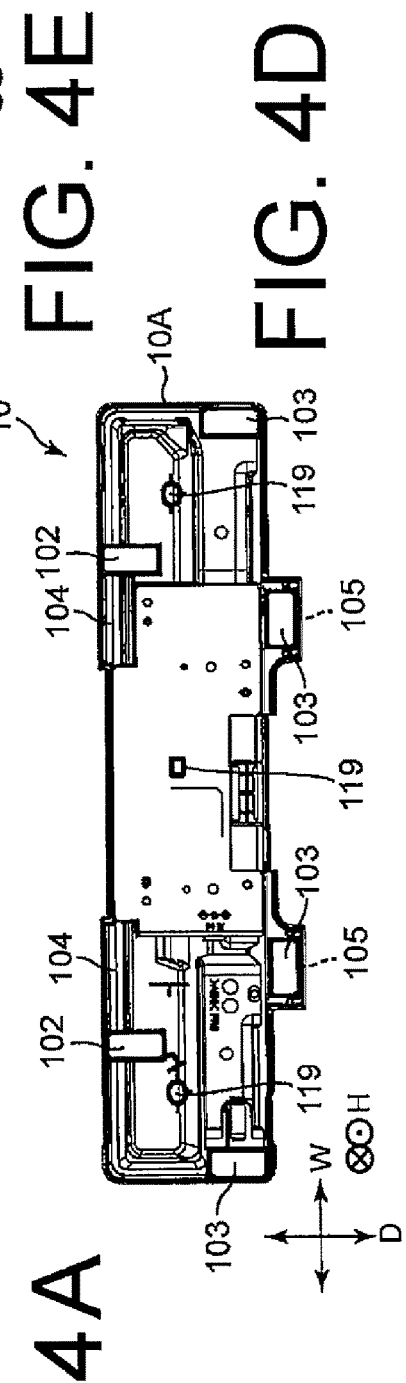

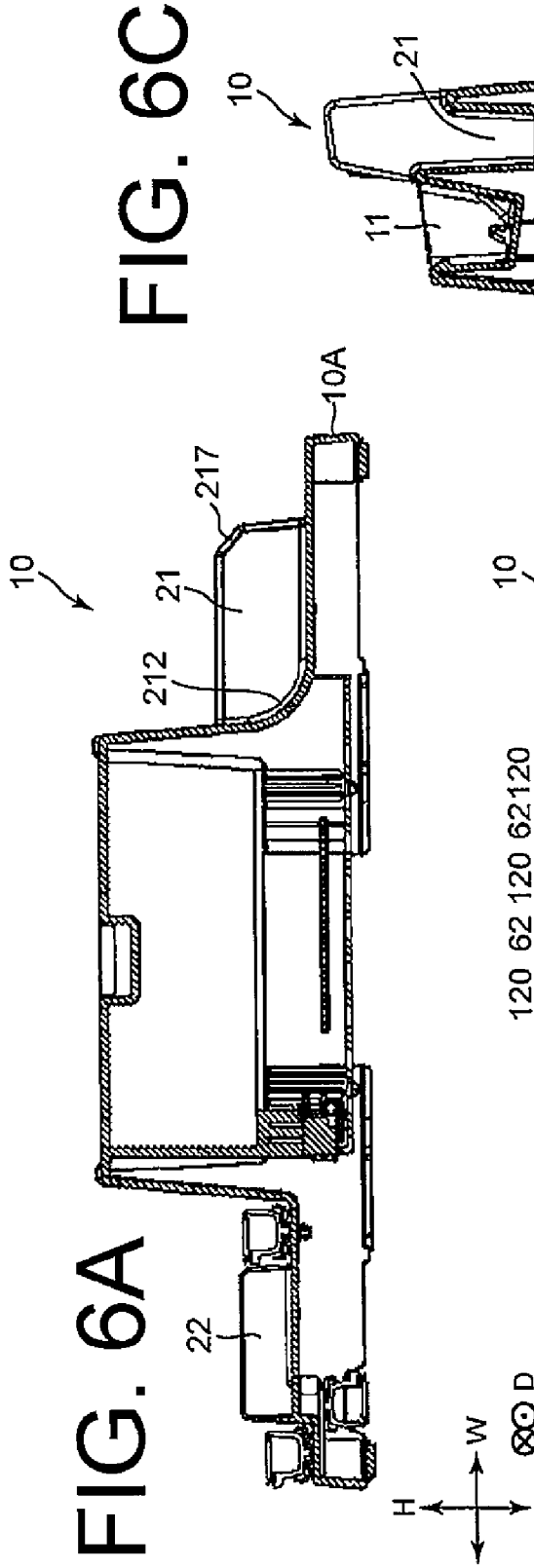
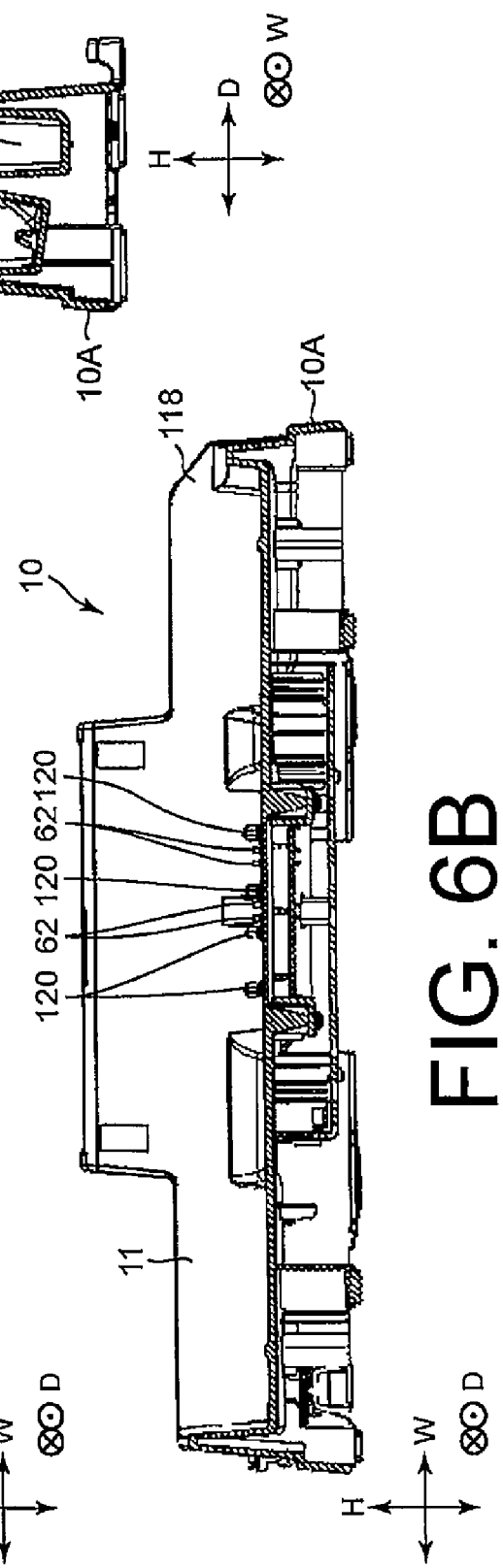
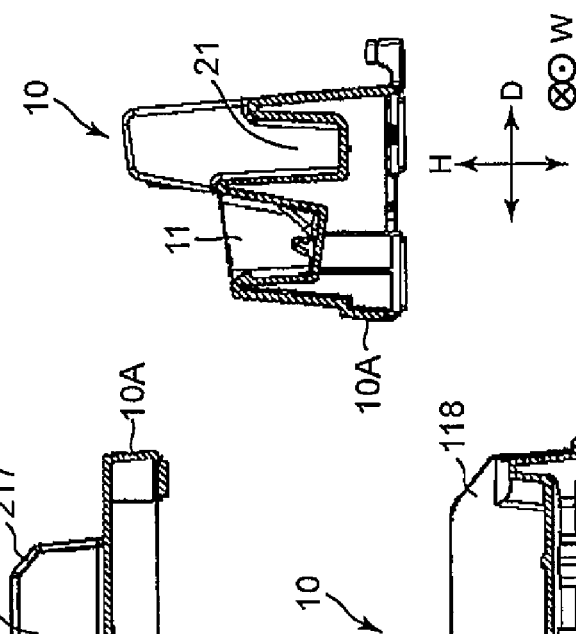

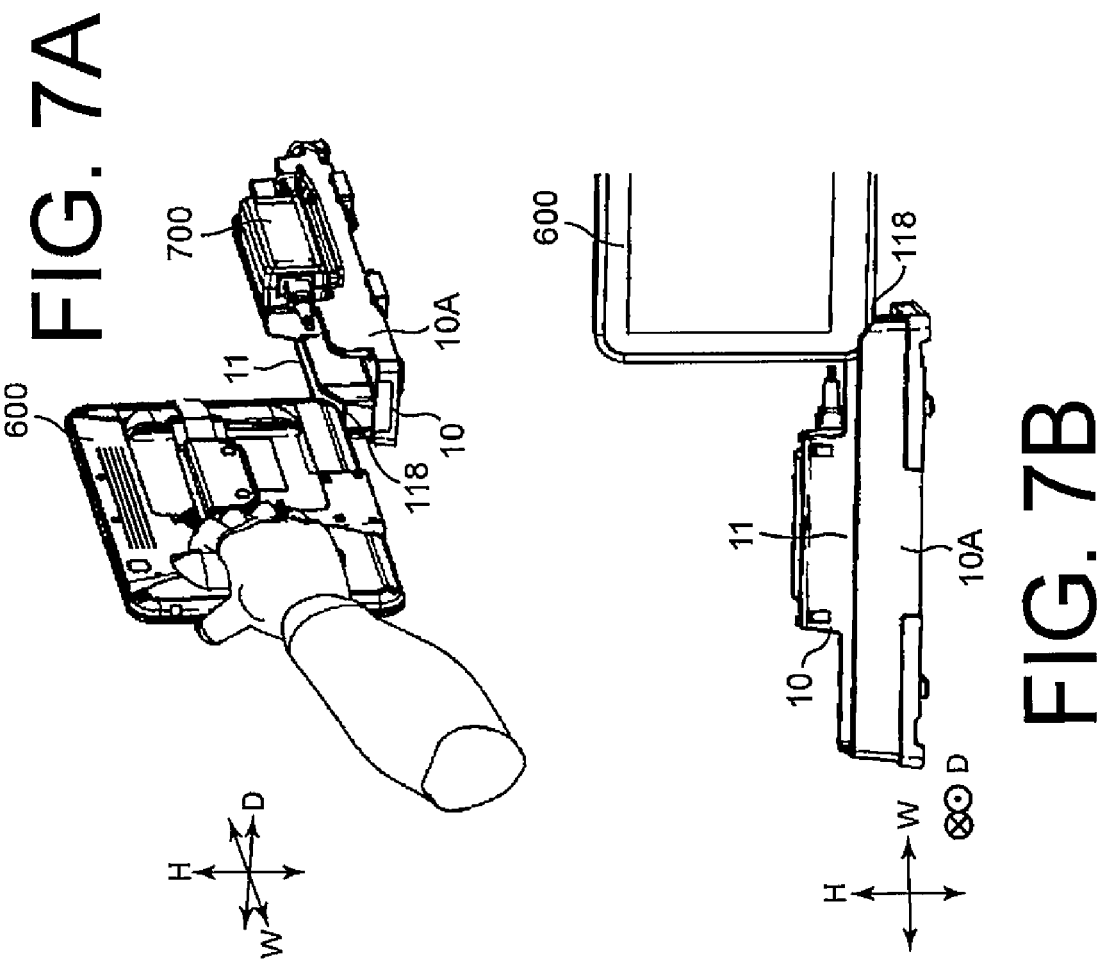

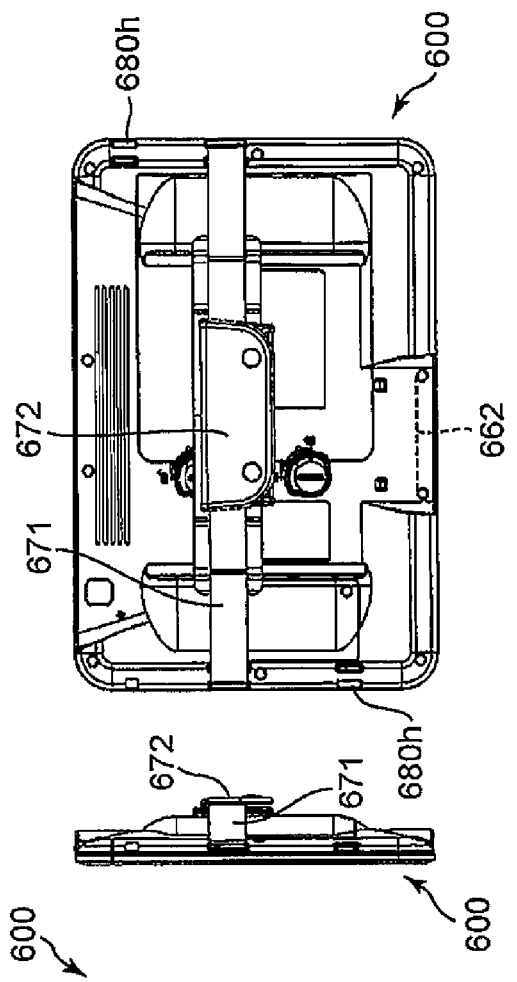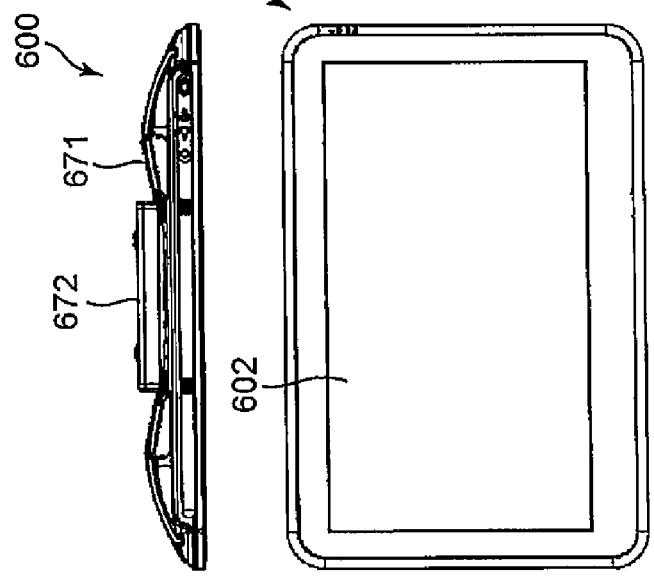

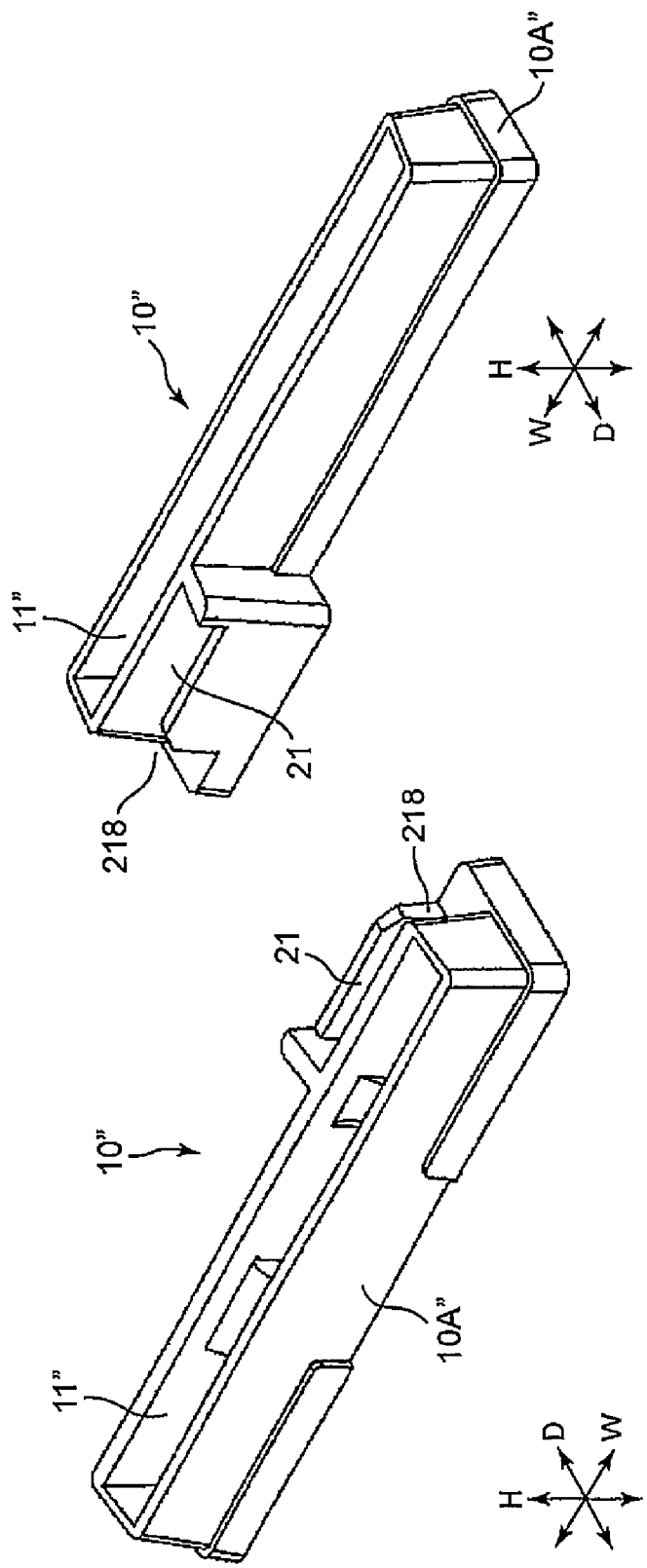

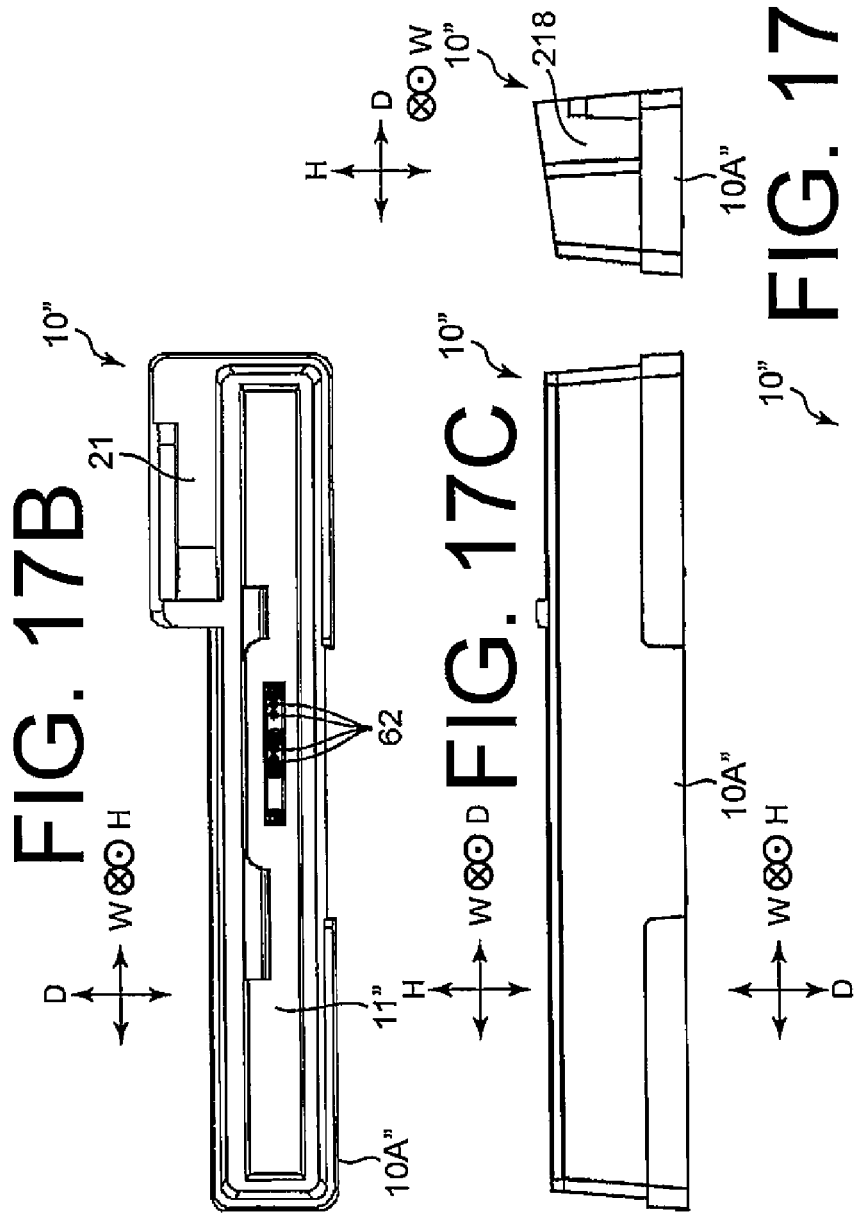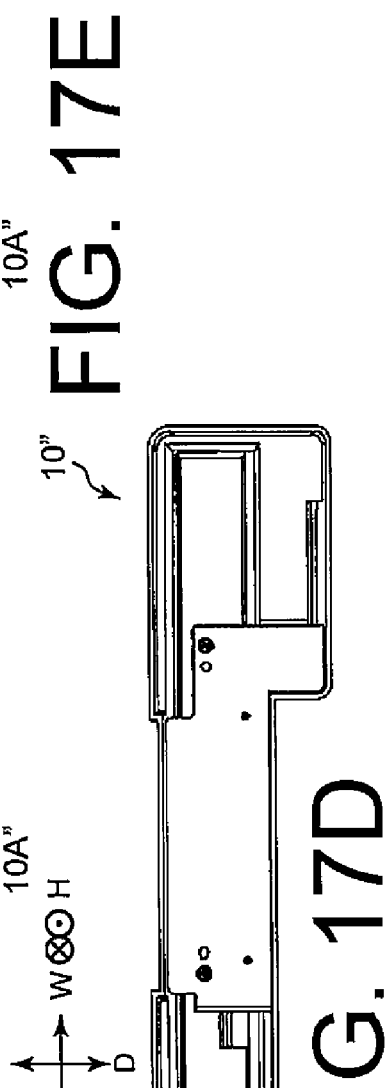

PORTABLE TERMINAL CHARGING STAND

This application is a National Stage Entry of PCT/JP2019/004961 filed on Feb. 13, 2019, which claims priority from Japanese Patent Application 2018-031878 filed on Feb. 26, 2018, the contents of all of which are incorporated herein by reference, in their entirety.

TECHNICAL FIELD

This invention relates to a portable terminal charging stand for mounting a portable terminal and for charging the portable terminal mounted thereon.

BACKGROUND ART

As a portable terminal which is a kind of portable electronic devices, there is known, for example, a tablet-type POS (Point Of Sales) terminal device for use in a POS system. In many cases, the portable terminal (tablet terminal) of the type has a plate shape and is provided on its plate surface with an input/output device (user interface) such as a touch panel display.

When such portable terminal is placed on a table or a shelf, a mounting stand is sometimes used to mount (support) the portable terminal with the touch panel display in a vertical position or in a backward inclined state. Some mounting stands have a function of charging a battery contained in the portable terminal and may also be called a charging stand.

In the meanwhile, there is a portable terminal (tablet terminal) equipped with a hand belt for a user to insert his/her hand in order to prevent the portable terminal from being dropped when it is held by the hand and used. Patent Literature 1 discloses a portable terminal mounting stand (supporting device) capable of supporting a portable terminal equipped with a hand belt on its rear surface.

PRIOR ART LITERATURE(S)

Patent Literature(s)

Patent Literature 1: JP 6198093 B

SUMMARY OF THE INVENTION

Means to Solve the Problem

On the other hand, some portable terminals are equipped with a shoulder strap to be slung over a user's shoulder in order to prevent the portable terminal from being dropped when it is held by a hand and used. Such a portable terminal is mounted to a charging stand at which an internal battery is charged or the portable terminal is used (pressing down a touch panel to perform input, visually confirming a processing result on a display, and so on). When the portable terminal equipped with the shoulder strap is mounted to the charging stand, the shoulder strap may be put into a knotted state or bundled and fastened by a magic tape (registered trademark) in order to prevent the shoulder strap, left uncared, from being caught and pulled to thereby knock down the charging stand and break the portable terminal and in order to provide a favorable appearance. However, such operation of adjusting a position of the shoulder strap is troublesome for a user.

The mounting stand disclosed in Patent Literature 1 is capable of reliably supporting even the portable terminal equipped with the hand belt on its rear surface. However, in case where the portable terminal equipped with the shoulder strap is mounted to the mounting stand, it is necessary to perform the operation of adjusting the position of the shoulder strap as described above.

In view of the above-mentioned circumstances, this invention has been made and it is an object of this invention to provide a charging stand capable of reducing a user's burden relating to an operation of adjusting a position of a shoulder strap when a portable terminal equipped with the shoulder strap is mounted to the charging stand.

Means to Solve the Problems

According to this invention, there is provided a portable terminal charging stand for mounting a portable terminal equipped with a shoulder strap and for charging the portable terminal mounted thereon, the portable terminal charging stand comprising a base portion placed at an installation position; a terminal accommodating portion formed on the base portion at a front side thereof, having a groove shape extending in a width direction of the base portion, and configured to accommodate a lower part of the portable terminal; a shoulder strap accommodating portion formed on the base portion behind the terminal accommodating portion, having a groove shape extending in the width direction, and configured to accommodate at least a part of the shoulder strap of the portable terminal mounted to the terminal accommodating portion; and a contact pin provided inside the terminal accommodating portion to be electrically connected to a charging contact terminal of the portable terminal accommodated in the terminal accommodating portion.

According to this invention, there is also provided a combination charging stand comprising a first charging stand and a second charging stand each of which is the charging stand mentioned above and which are removably connected to each other in the forward-backward direction of the base portions; the AC adapter; and the charging cable, the AC adapter having a power supply capacity enough to supply electric power to two or more portable terminals and fitted to the AC adapter fitting portion of the first charging stand, the charging cable being branched to electrically connect the AC adapter fitted to the AC adapter fitting portion of the first charging stand to each of the contact pins of the first and the second charging stands, the charging cable having a part accommodated in the cable accommodating portion of the first charging stand.

Effect of the Invention

The portable terminal charging stand according to this invention is capable of reducing a user's burden regarding an operation of adjusting a position of a shoulder strap when a portable terminal equipped with the shoulder strap is mounted to the charging stand.

BRIEF DESCRIPTION OF THE DRAWINGS

FIG. 3A and FIG. 3B are a right front perspective view and a left rear perspective view of the portable terminal charging stand according to the first embodiment of this; invention, respectively;

FIGS. 4A, 4B, 4C, 4D, and 4E are a left side view, a top view, a front view, a bottom view, and a right side view of the portable terminal charging stand according to the first embodiment of this; invention, respectively;

FIG. 6A is a sectional view of the charging stand, taken along a section line 6A-6A in FIG. 4B, FIG. 6B is a sectional view of the charging stand, taken along a section line 6B-6B in FIG. 4B, and FIG. 6C is a sectional view of the charging stand, taken along a section line 6C-6C in FIG. 4B;

FIGS. 7A, 7B, and 7C are sectional views for describing a method of mounting a portable terminal on the portable terminal charging stand according to the first embodiment of this invention;

FIGS. 9A, 9B, 9C, and 9D are a top view, a front view, a right side view, and a rear view of the portable terminal in a state where a shoulder strap is removed therefrom, respectively;

FIGS. 16A and 16B are a right front perspective view and a left rear perspective view of a portable terminal charging stand according to a fourth embodiment of this invention, respectively;

FIGS. 17A, 17B, 17C, 17D, and 17E are a left side view, a top view, a front view, a bottom view, and a right side view of the portable terminal charging stand according to the fourth embodiment of this invention, respectively.

MODE FOR EMBODYING THE INVENTION

Figure 1:
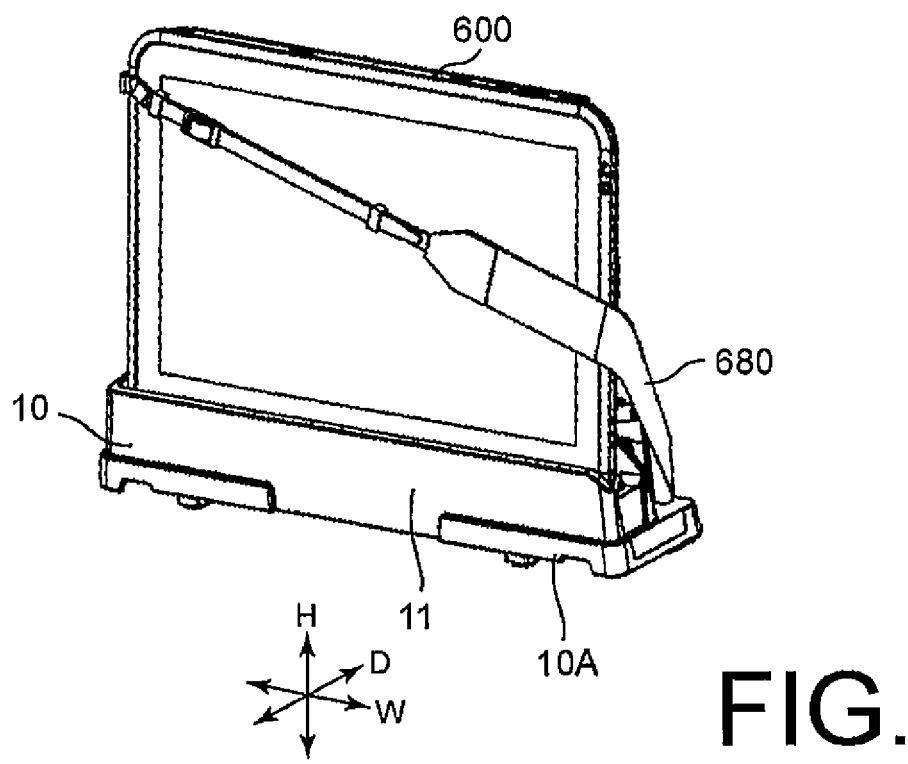
FIG. 1 is a right front perspective view of a portable terminal charging stand according to a first embodiment of this invention.

Hereinafter, embodiments of this invention will be described with reference to the drawings. In the following embodiments, a tablet type POS (Point Of Sales) terminal device for use in a POS system will be described as a portable terminal by way of example.

In the figures, arrows assigned with symbols W, H, and D represent a width direction (leftward-rightward direction), a height direction (upward-downward direction), and a depth direction (forward-backward direction) of a portable terminal charging stand (a base portion thereof, which will later be described) according to each embodiment, respectively.

At first, referring to FIGS. 8A and 8B and FIGS. 9A to 9D, description will be made about a portable terminal (POS terminal device) 600 as an object to be mounted to the portable terminal charging stand. In FIGS. 9A to 9D, the portable terminal 600 is illustrated in a state where a shoulder strap, which will later be described, is removed therefrom.

The portable terminal 600 is of a tablet type and has a touch panel display 602 on its front surface. The portable terminal 600 is equipped with a hand belt 671 for a user to insert his/her hand and a shoulder strap 680 for the user to sling the portable terminal 600 over his/her shoulder. The hand belt 671 is provided with a pad 672 at its center. The shoulder strap 680 is attached to the portable terminal 600 by inserting a strap end through a pair of through holes 680h (FIG. 9D) formed on a rear surface of the portable terminal 600 and then fixing the shoulder strap by a buckle. In the shoulder strap 680, a portion between the pair of through holes has a length of about 1 meter. A lower end of the portable terminal 600 is provided with a charging and terminal-detecting contact terminal 662 for charging, which is electrically connectable to contact pins 62 of the charging stand, which will later be described. The portable terminal 600 functions as the POS terminal device for communicating with other devices (host device, printer, and so on) in the POS system via radio communication.

First Embodiment

Referring to FIGS. 1 to 7C, a portable terminal charging stand according to a first embodiment of this invention will be described.

Figure 2:
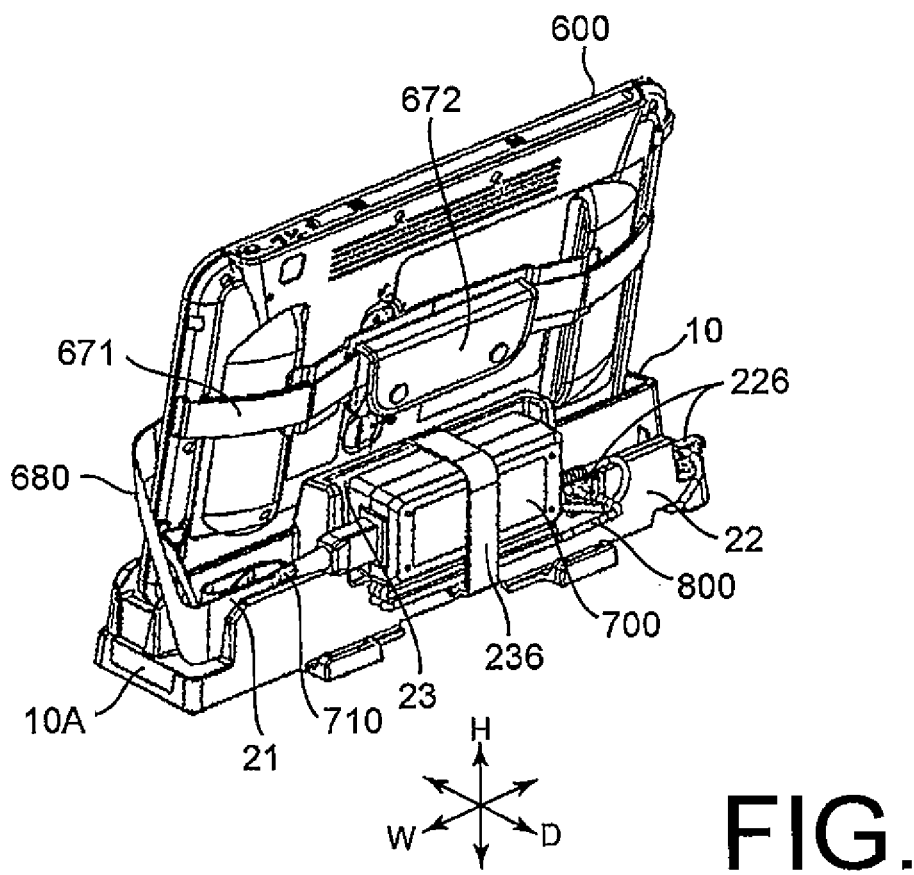
FIG. 2 is a right rear perspective view of the portable terminal charging stand according to the first embodiment of this invention.
Figure 5:
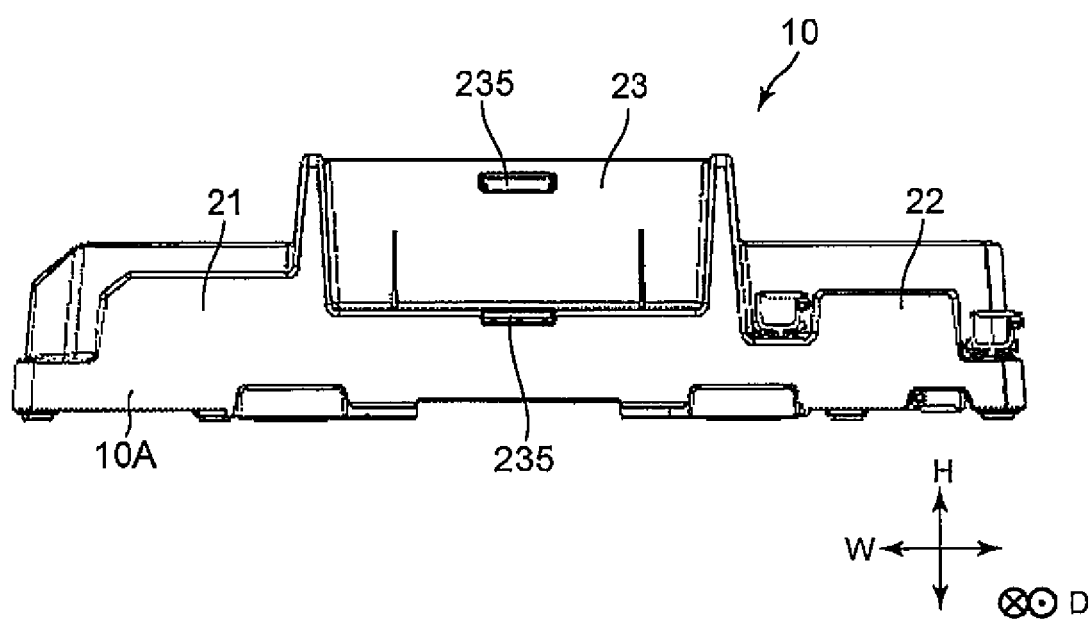
FIG. 5 is a rear view of the charging stand according to the first embodiment of this invention.
Figures 8A, 8B:
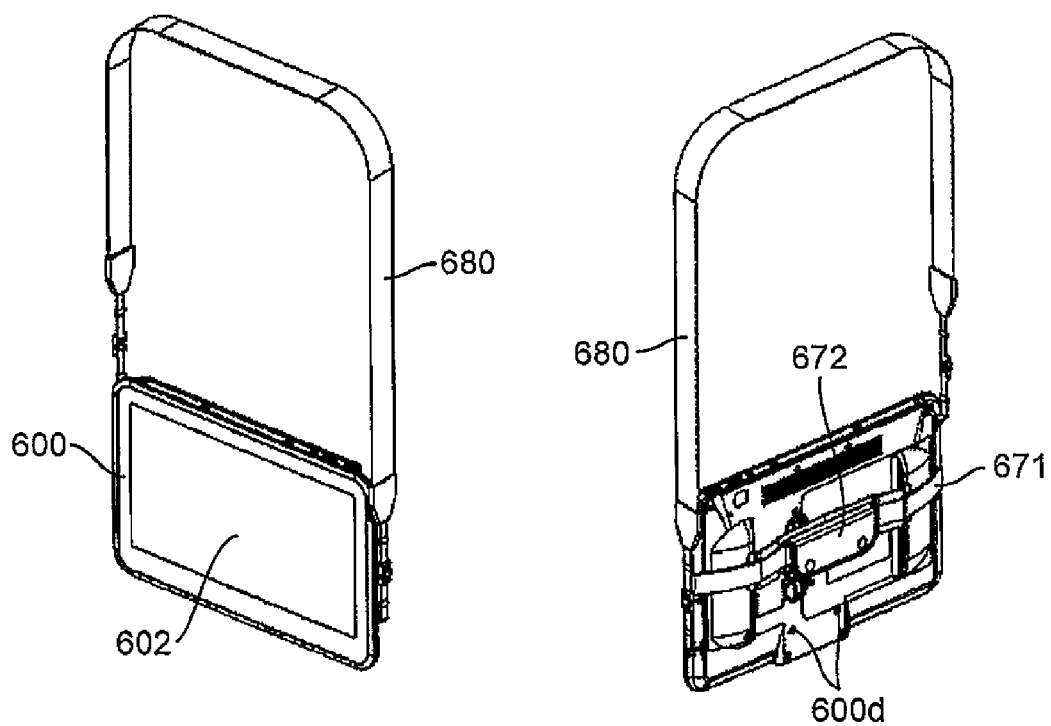
FIG. 8A and FIG. 8B are a right front perspective view and a right rear perspective view of the portable terminal as an object to be mounted to the portable terminal charging stand according to the first embodiment of this invention, respectively.

FIG. 1 is a right front perspective view of the charging stand 10 with the portable terminal 600 mounted thereto. FIG. 2 is a right rear perspective view of the charging stand 10 with the portable terminal 600 mounted thereto. FIG. 3A is a right front perspective view of the charging stand 10 without the portable terminal 600 mounted thereto. FIG. 3B is a left rear perspective view of the charging stand 10 without the portable terminal 600 mounted thereto. In FIGS. 4A, 4B, 4C, 4D, and 4E are a left side view, a top view, a front view, a bottom view, and a right side view of the portable terminal charging stand 10 according to the first embodiment of this invention, respectively. FIG. 5 is a rear view of the charging stand 10. FIG. 6A is a sectional view of the charging stand, taken along a section line 6A-6A in FIG. 4B. FIG. 6B is a sectional view of the charging stand, taken along a section line 6B-6B in FIG. 4B. FIG. 6C is a sectional view of the charging stand, taken along a section line 6C-6C in FIG. 4B. FIGS. 7A, 7B, and 7C are perspective views for describing a method of mounting the portable terminal to the charging stand 10.

Now, referring to FIGS. 1 to 7C, the portable terminal charging stand 10 according to the first embodiment of this invention is a charging stand (mounting stand with a charging function) for mounting the portable terminal 600 equipped with the shoulder strap 680 and for charging the portable terminal 600 mounted thereto.

The charging stand 10 comprises a base portion 10A, a terminal accommodating portion 11, the contact pins 62 (FIG. 4B), a shoulder strap accommodating portion 21, an AC adapter fitting portion 23, an adapter fixing band 236, and a cable accommodating portion 22.

The base portion 10A is placed at an installation location, for example, on a desk or on a shelf of a cabinet. The terminal accommodating portion 11 is formed on the base portion 10A on a front side thereof, has a groove shape extending in the width direction W of the base portion 10A, and accommodates a lower part of the portable terminal 600. The contact pins 62 are provided inside the terminal accommodating portion 11, are of a probe pin type, and are electrically connected to the charging and terminal-detecting contact terminal 662 (see FIG. 9D) of the portable terminal 600 accommodated in the terminal accommodating portion 11.

The terminal strap accommodating portion 21 is provided on the base portion 10A behind the terminal accommodating portion 11, has a groove shape extending in the width direction W, and accommodates at least a part of the shoulder strap 680 of the portable terminal 600 mounted to the terminal accommodating portion 11.

The AC adapter fitting portion 23 is formed on the base portion 10A behind the terminal accommodating portion 11, and is configured to be fitted with an AC adapter 700 for power supply through the contact pins 62 to the portable terminal 600 accommodated in the terminal accommodating portion 11. The adapter fixing band 236 is inserted through a hole portion formed in the AC adapter fitting portion 23 and fixes the AC adapter 700 fitted to the AC adapter fitting portion 23.

The cable accommodating portion 22 is formed on the base portion 10A behind the terminal accommodating portion 11, has a groove shape, and accommodates a charging cable 800 electrically connecting the AC adapter 700 fitted to the AC adapter fitting portion 23 and the contact pins 62.

The terminal accommodating portion 11 has a terminal-use cutout portion 118 which is formed at one end (right end in this embodiment) in the width direction W and which serves to insert and remove the portable terminal 600 into and from the terminal accommodating portion 11 in the width direction W.

The shoulder strap accommodating portion 21 is formed behind the terminal accommodating portion 11 on the side of the right end as the one end of the terminal accommodating portion 11 in the width direction W. The shoulder strap accommodating portion 21 has a strap-use cutout portion 218 formed at its one end in the width direction W and adapted to guide the shoulder strap 680 into and out of the shoulder strap accommodating portion 21 in the width direction W.

The cable accommodating portion 22 is formed behind the terminal accommodating portion 11 at the other end (left end in this embodiment) of the terminal accommodating portion 11 in the width direction W.

The AC adapter fitting portion 23 is formed behind the terminal accommodating portion 11 between the shoulder strap accommodating portion 21 and the cable accommodating portion 22.

Hereinafter, the charging stand 10 will be described more in detail.

As illustrated in FIGS. 1 and 2, the portable terminal 600 is mounted to the charging stand 10 at a predetermined angle (80 degrees in this embodiment). The shoulder strap 680 is folded in multiple layers and accommodated in the shoulder strap accommodating portion 21 formed on a right side behind the terminal accommodating portion 11. The portable terminal 600 is equipped with the hand belt 671 for the user to insert his/her hand. At the center of a rear part of the charging stand 10, the AC adapter 700 is fixed by a fixing belt. The charging cable 800 extending from the AC adapter 700 and having a plug at its end is guided through two cable guide members 226 into the inside of the base portion 10A. For an AC cord 710 of the AC adapter 700, illustration is cut off in the middle.

As illustrated in FIGS. 3A and 3B, the charging stand 10 has the base portion 10A, the terminal accommodating portion 11, a standing portion 113, the shoulder strap accommodating portion 21, and the cable accommodating portion 22. The terminal accommodating portion 11 is provided with fall-prevention protrusions 115 formed at two positions on an internal surface of a front part thereof to prevent the portable terminal 600 mounted to the charging stand 10 from falling frontward. The standing portion 113 is provided with terminal receiving protrusions 117 formed at two positions to be brought into contact with corresponding recesses 600d of the portable terminal 600 mounted to the charging stand 10. To the cable accommodating portion 22, the two cable guide members 226 are attached.

As shown in FIGS. 4A to 4E and FIG. 5, the charging stand 10 comprises the base portion 10A, the terminal accommodating portion 11, the standing portion 113, the cable accommodating portion 22, and the shoulder strap accommodating portion 21. The terminal accommodating portion 11, the shoulder strap accommodating portion 21, and the cable accommodating portion 22 are formed on the base portion 10A. In a front view, the standing portion 113 is formed at the center of a rear part of the terminal accommodating portion 11. The cable accommodating portion 22 is formed at the left of the rear part of the terminal accommodating portion 11. The shoulder strap accommodating portion 21 is formed at the right of the rear part of the terminal accommodating portion 11.

The base portion 10A contains a circuit board (not shown) with a charge control portion mounted thereto, and a connector 64 (see FIG. 10) connected to the plug formed at an end of the charging cable 800. The base portion 10A has a lower surface (bottom surface) provided with two leg portions 102 formed at its front part and four leg portions 103 formed at its rear part. Each of these leg portions has a surface made of an elastic material to prevent slipping of the charging stand 10.

Between the two leg portions 102 at the front part, two connecting engaging recesses 104 are formed. The inner two leg portions 103 at the rear part also serve as two connecting engaging protrusions 105. As is clear by referring to FIG. 10 in combination, the two connecting engaging recesses 104 are engageable with two connecting engaging protrusions 105 of one charging stand 10 (charging stand 10-1 in FIG. 10) connected to a front side of the other charging stand 10 (charging stand 10-2 in FIG. 10). On the other hand, the two connecting engaging protrusions 105 are engageable with two connecting engaging recesses 104 of one charging stand 10 (charging stand 10-2 in FIG. 10) connected to a rear side of the other charging stand 10 (charging stand 10-1 in FIG. 10). Thus, by engaging the two connecting engaging recesses 104 and the two connecting engaging protrusions 105, it is possible to connect the two charging stands (charging stands 10-1 and 10-2 in FIG. 10).

The terminal accommodating portion 11 guides the portable terminal 600 when the portable terminal is mounted, and accommodates the lower part of the portable terminal 600. As illustrated in FIG. 4B, the standing portion 113 of the terminal accommodating portion 11 is provided with two terminal guide protrusions 116 for guiding the portable terminal 600 when the portable terminal is mounted. As illustrated in FIG. 3A, the standing portion 113 of the terminal accommodating portion 11 is provided with the terminal receiving protrusions 117 formed at two positions to be brought into contact with the recesses 600d (FIG. 8B) formed at the lower part of the portable terminal 600 when the portable terminal is mounted. As illustrated in FIG. 4B which is the top view of the charging stand 10, the terminal accommodating portion 11 is provided with the probe-type contact pins 62 to be brought into contact with the charging and terminal-detecting contact terminal 662 (see FIG. 9D) including two contact points for charging, formed in a recessed portion at the center of a lower surface of the portable terminal 600, and two contact points for detecting that the portable terminal is mounted to the charging stand 10. In the vicinity of the contact pins 62, four guide protrusions 120 are formed to be fitted to four recesses (not shown) formed and further recessed in the recessed portion at the center of the lower surface of the portable terminal 600. The terminal accommodating portion 11 is provided with the terminal-use cutout portion 118 formed on a right side in a front view. As illustrated in FIG. 6B, the terminal-use cutout portion 118 has a height lower than that of the left end of the terminal accommodating portion 11 and higher than that of the four guide protrusions 120 formed in the vicinity of the contact pins 62. The terminal-use cutout portion 118 is formed so that the portable terminal 600 is mounted to the charging stand 10 from a lateral side in the width direction W in case where the charging stand 10 is installed in a space where the portable terminal 600 cannot be mounted from an upper side.

Next referring to FIGS. 7A to 7C, description will be made of a method of mounting the portable terminal 600 to the charging stand 10 according to the first embodiment of this invention from the lateral side. In FIGS. 7A to 7C, the fixing belt for the AC adapter 700 is not illustrated and, for the AC cord of the AC adapter 700, illustration is cut off in the middle.

As illustrated in FIGS. 7A and 7B, the user grips the portable terminal 600 and places its left end on the terminal-use cutout portion 118. Next, as illustrated in FIG. 7C, the user moves the portable terminal 600 leftward in the width direction W until its left end is brought into contact with the left end of the terminal accommodating portion 11. Thereafter, when the user stops gripping of the portable terminal 600, the lower end of the portable terminal 600 falls into the terminal accommodating portion 11 under its own weight to be mounted to the charging stand 10. On the other hand, when the portable terminal 600 is taken out from the charging stand 10, the user grips and upwardly lifts the portable terminal 600, places its right end on the terminal-use cutout portion 118, and then moves the portable terminal along the terminal-use cutout portion 118 rightward in the width direction W to pull out the portable terminal. Thus, even if the charging stand 10 is present in a space where the portable terminal 600 cannot be mounted from the upper side, it is possible to mount the portable terminal 600 to the charging stand 10 and to take out the portable terminal 600 from the charging stand 10.

As illustrated in FIG. 4B, on the bottom surface inside the terminal accommodating portion 11, drainage holes 119 communicating with the lower surface of the charging stand 10 are formed at three positions near the rear part. As illustrated in FIG. 6C, the bottom surface inside the terminal accommodating portion 11 is inclined to be lowered rearward in the depth direction D. Therefore, even if a liquid such as water enters into the terminal accommodating portion 11, the liquid is discharged through the drainage holes 119 to the outside of the charging stand 10.

As illustrated in FIG. 3A, the standing portion 113 is formed at the center of the rear part of the terminal accommodating portion 11 in a front view. The standing portion 113 is continuous with the internal surface of the terminal accommodating portion 11 and inclined at a predetermined angle (80 degrees in this embodiment). The standing portion 113 has a height such that the standing portion does not interfere with the hand belt 671 of the portable terminal 600 when the portable terminal 600 is mounted to the charging stand 10. The standing portion 113 has a rear surface provided with the adapter fitting portion 23 for fitting the adapter 700, as illustrated in FIG. 3B. The adapter fitting portion 23 is provided with a fixing belt hole 235 for insertion of the fixing belt 236 for fixing the adapter 700.

As illustrated in FIGS. 3A and 3B and FIGS. 6A and 6C, the shoulder strap accommodating portion 21 is provided behind the right end of the terminal accommodating portion 11 in a front view. As illustrated in FIG. 2, the shoulder strap accommodating portion 21 can accommodate the shoulder strap 680 folded into multiple layers. The shoulder strap accommodating portion 21 has a groove space formed on the right side behind the terminal accommodating portion 11 and extending in the width direction W. Since an upper side and a right side of the groove space are continuously opened, the shoulder strap 680 can be accommodated from any direction from the upper side, from the right side, or from an obliquely right upper side. As illustrated in FIG. 6C, the groove space has a tapered shape widened upward. In addition, as illustrated FIG. 6C, in the groove space, a backward wall surface in the depth direction D has a height lower than that of a frontward wall surface adjacent to the terminal accommodating portion 11. Furthermore, as illustrated in FIG. 6A, a corner 217 of a wall portion of the shoulder strap accommodating portion 21 has a chamfered shape. Due to those unique shapes, the shoulder strap accommodating portion 21 can easily accommodate the shoulder strap 680 folded in multiple layers. The corner of the wall portion of the shoulder strap accommodating portion 21 may have a rounded shape. Furthermore, as illustrated in FIG. 6A, a left end 212 of the groove space has a rounded shape so that dust entering into the groove space can easily be removed. Furthermore, the shoulder strap accommodating portion 21 is formed on the right side in the width direction W, which is the same side as the terminal-use cutout portion 118 of the terminal accommodating portion 11. Therefore, even in a case where the charging stand 10 is present in a space such that the charging stand 10 cannot be mounted from the upper side, it is possible to mount the portable terminal 600 in the terminal accommodating portion 11 of the charging stand 10 along the width direction W, i.e., from the lateral side, and to accommodate the shoulder strap 680, folded into multiple layers, in the shoulder strap accommodating portion 21.

As illustrated in FIGS. 3A and 3B and FIG. 6A, the cable accommodating portion 22 is disposed on a left side behind the terminal accommodating portion 11. The cable accommodating portion 22 can accommodate a charging cable of a branch type which is used to bifurcate an output of one AC adapter 700 to two charging stands when the two charging stands are used in a connected state. When the charging stand is used alone, the cable accommodating portion 22 accommodates a remaining part of the charging cable 800 which is wired at a lower part of the charging stand 10.

When one charging stand 10 is used alone instead of using the two charging stands 10 connected to each other, the two connecting engaging recesses 104, the two connecting engaging protrusions 105, and the cable accommodating portion 22 may not be provided. In case where the AC adapter 700 is not fixed to the charging stand 10, the AC adapter fitting portion 23 need not be provided.

The above-mentioned charging stand according to the first embodiment is capable of reducing a user's burden relating to the operation of adjusting the position of the shoulder strap because the shoulder strap can be accommodated when the portable terminal equipped with the shoulder strap is mounted to the charging stand.

Second Embodiment

Next, referring to FIG. 10, FIGS. 11A to 11C, and FIG. 12, a second embodiment of this invention will be described.

A portable terminal charging stand according to the second embodiment is different from the charging stand according to the first embodiment in that it is a combination charging stand comprising a combination of two charging stands. Since the other structure is similar to that of the first embodiment, the drawings and the description of the first embodiment will be incorporated as necessary and detailed description thereof will be omitted.

Figure 10:
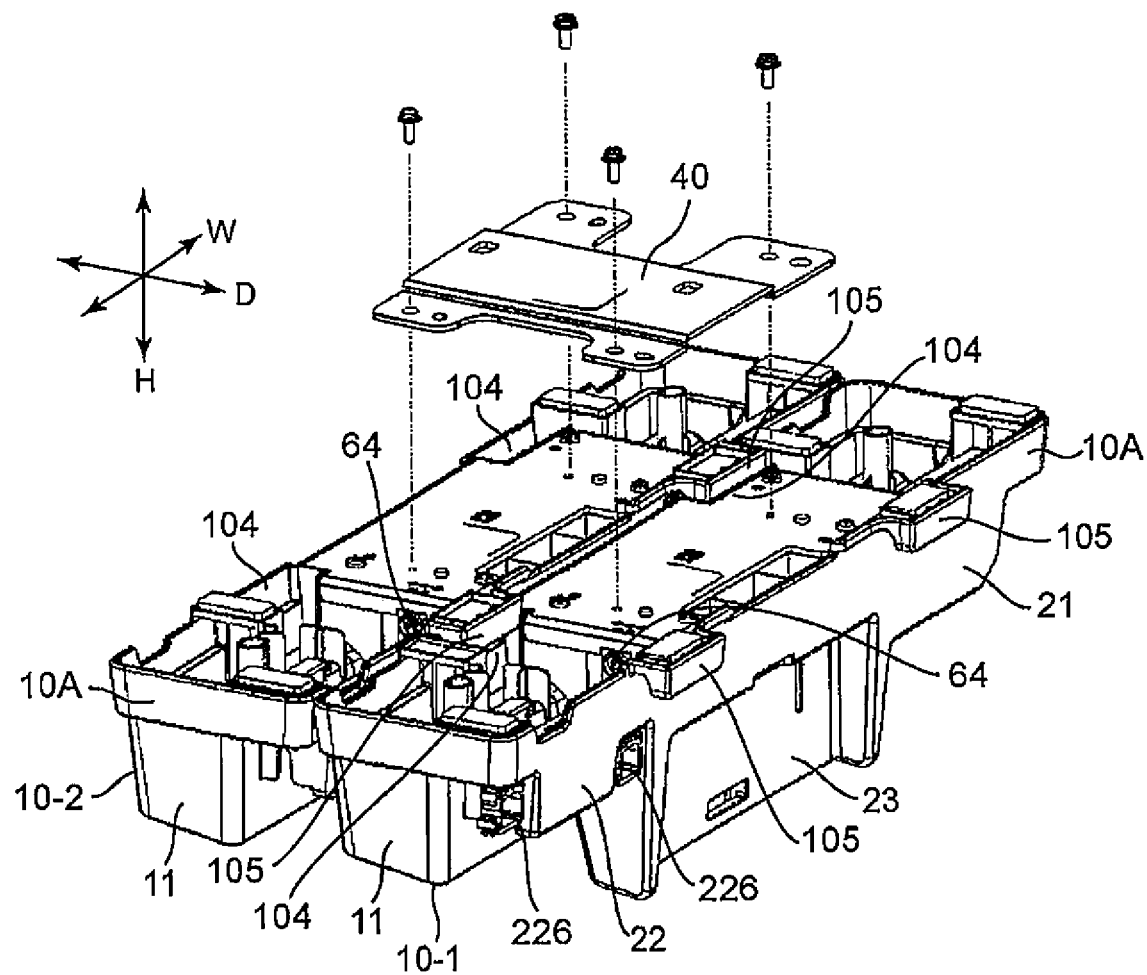
FIG. 10 is a perspective view for describing a charging stand connecting structure in a combination charging stand according to a second embodiment of this invention.
Figure 11C:
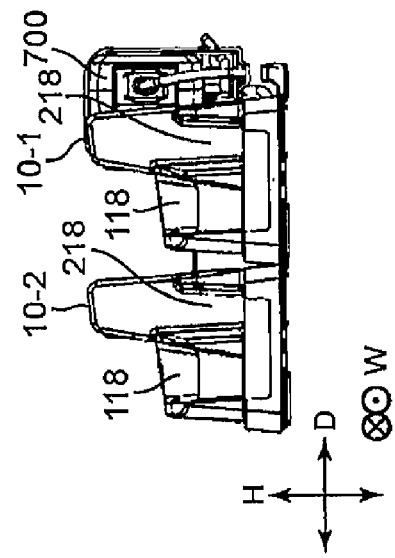
FIGS. 11A, 11B, and 11C are a top view, a front view, and a right side view of the combination charging stand according to the second embodiment of this invention, respectively.
Figure 11A:
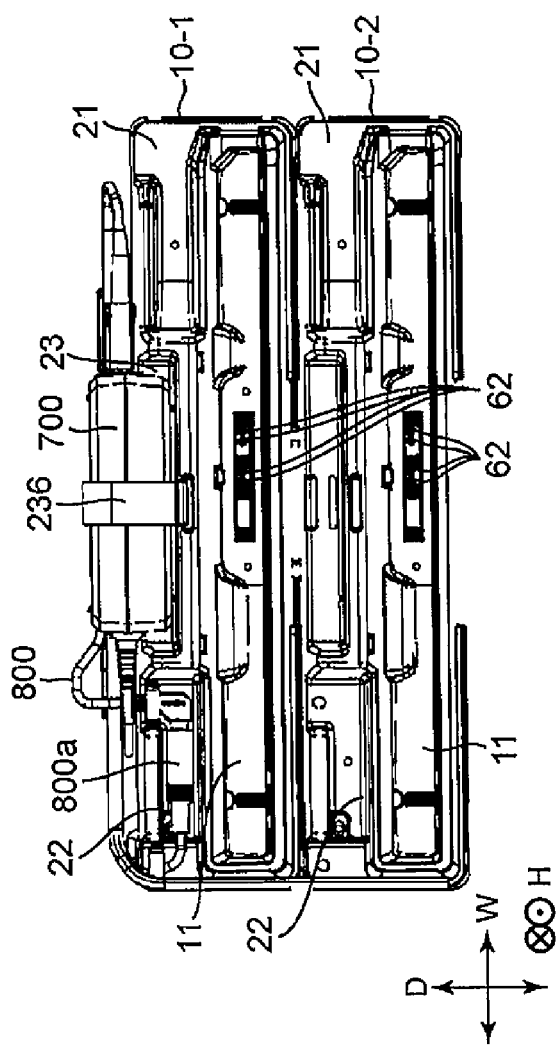
Figure 11B:
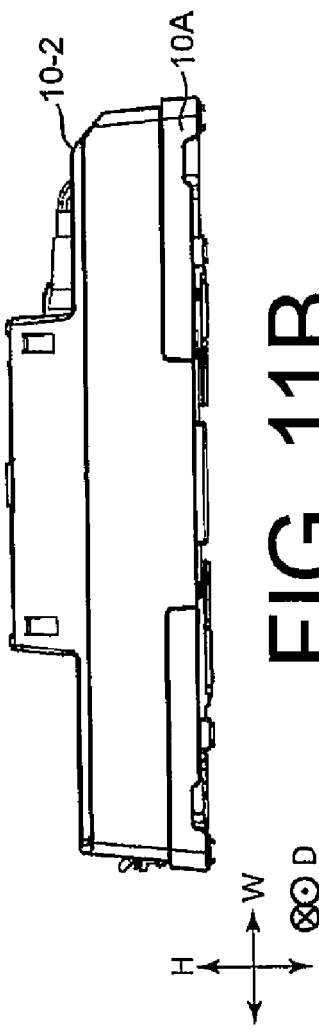
Figure 12:
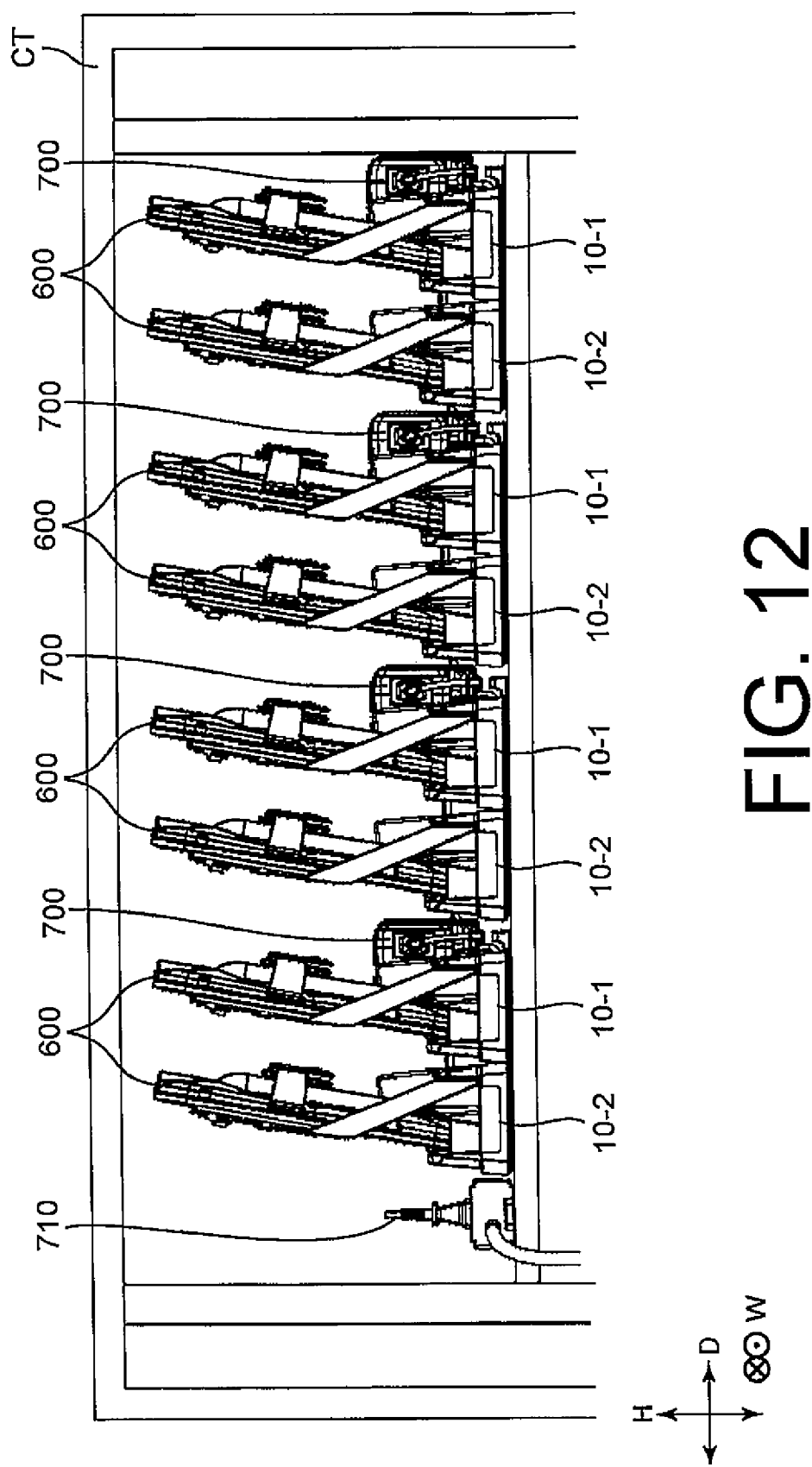
FIG. 12 is a right side view of four combination charging stands according to the second embodiment of this invention when they are installed in a cabinet.
Figure 13:
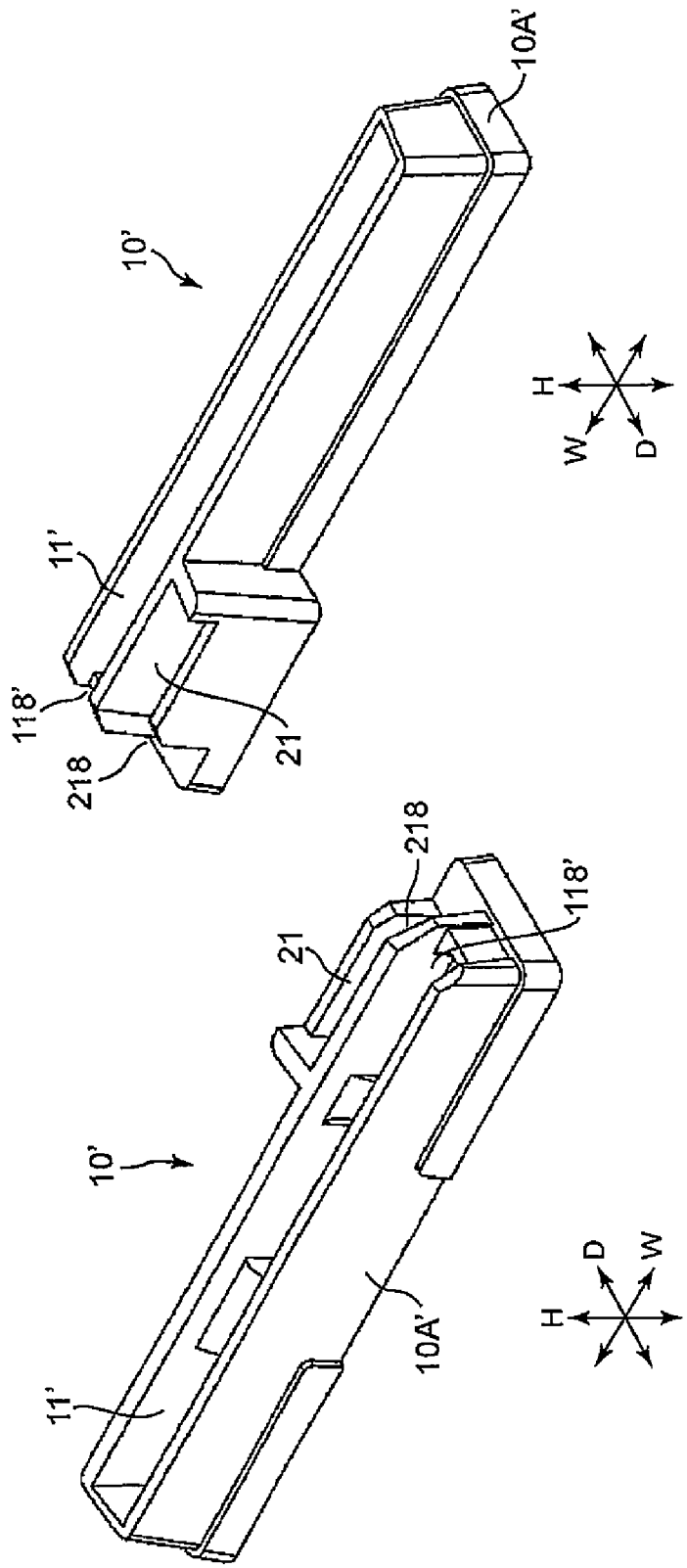
FIGS. 13A and 13B are a right front perspective view and a left rear perspective view of a portable terminal charging stand according to a third embodiment of this invention, respectively.
Figure 14:
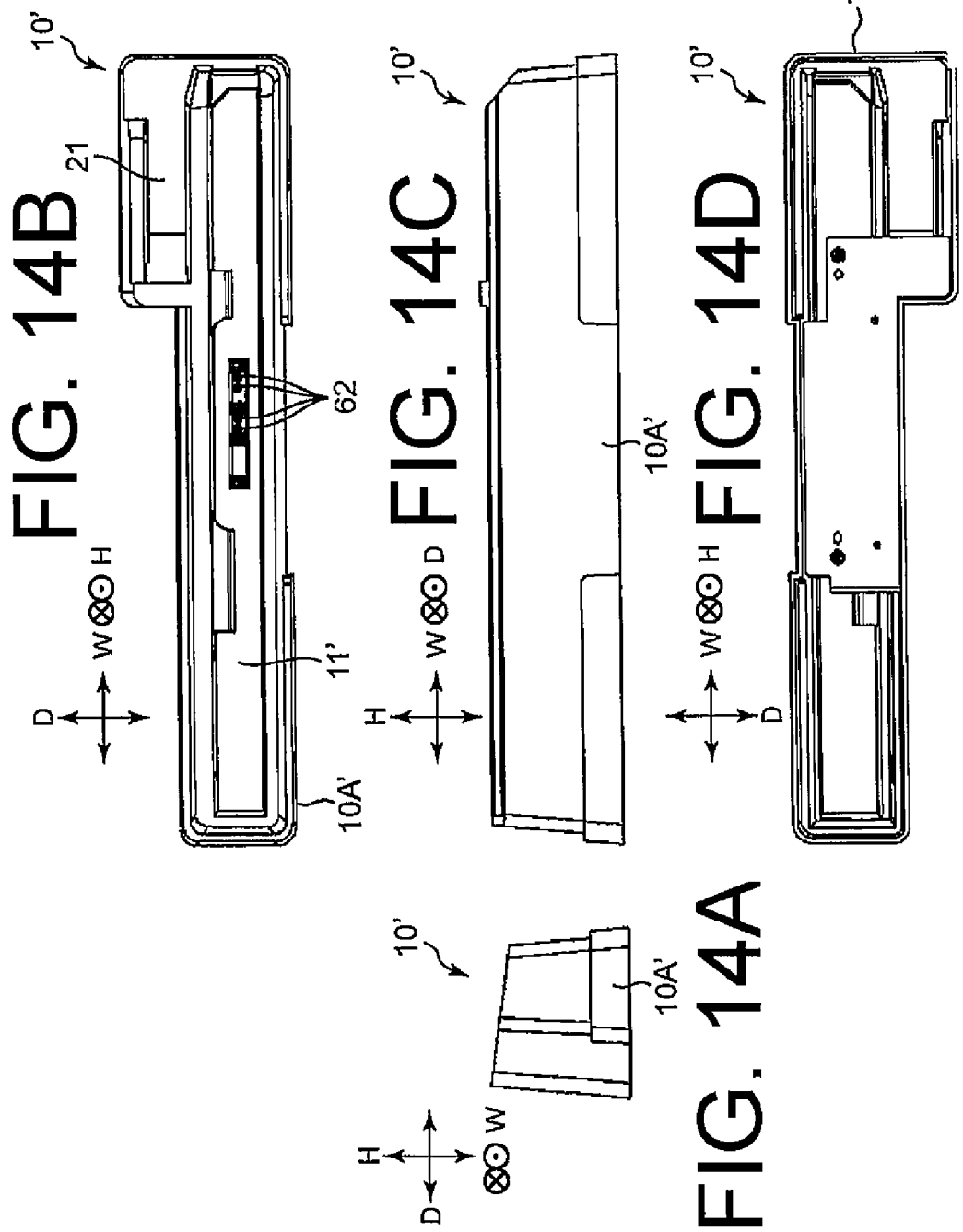
FIGS. 14A, 14B, 14C, 14D, and 14E are a left side view, a top view, a front view, a bottom view, and a right side view of the portable terminal charging stand according to the third embodiment of this invention, respectively.
Figure 15:
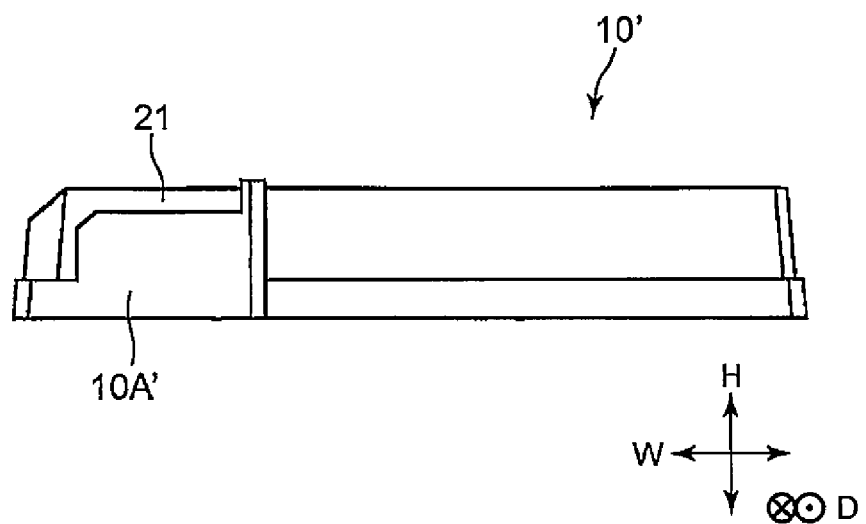
FIG. 15 is a rear view of the charging stand according to the third embodiment of this invention.
Figure 18:
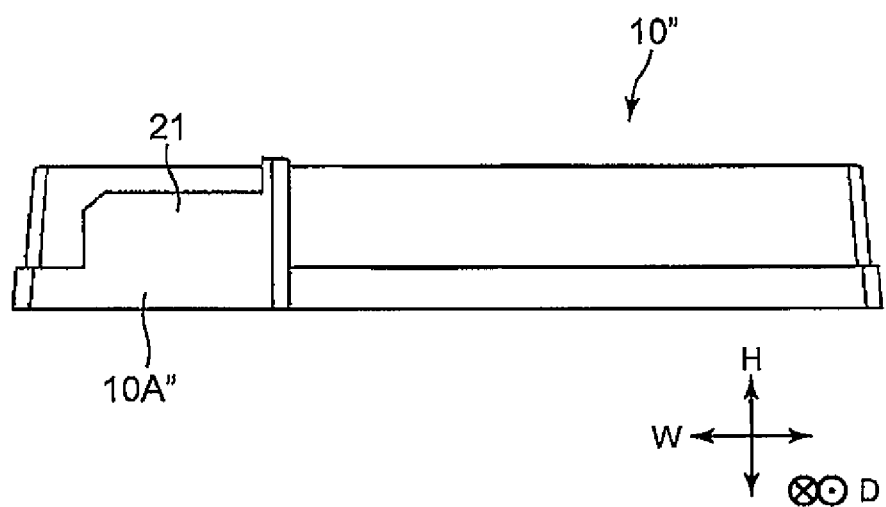
FIG. 18 is a rear view of the charging stand according to the fourth embodiment of this invention.

Referring to FIG. 10 to FIG. 12, the combination charging stand according to the second embodiment of this invention comprises a first charging stand 10-1 and a second charging stand 10-2 each of which is same as the charging stand 10 according to the first embodiment and which are removably connected to each other in the forward-backward direction of the base portions 10A.

Each of the first charging stand 10-1 and the second charging stand 10-2 has the base portion 10A, the terminal accommodating portion 11, the shoulder strap accommodating portion 21, the AC adapter fitting portion 23, and the cable accommodating portion 22.

Like in the first embodiment, the AC adapter fitting portion 23 is formed on the base portion 10A behind the terminal accommodating portion 11, and is fitted with the AC adapter 700 for electric power supply through the contact pins 62 to the portable terminal accommodated in the terminal accommodating portion 11.

Like in the first embodiment, the cable accommodating portion 22 is formed on the base portion 10A behind the terminal accommodating portion 11, has a groove shape, and accommodates the charging cable electrically connecting the AC adapter 700 fitted to the AC adapter fitting portion 23 and the contact pins 62.

Only one AC adapter 700 is used for one combination charging stand and has a power supply capacity capable of supplying electric power to two or more portable terminals. The AC adapter 700 is fitted to the AC adapter fitting portion 23 of the first charging stand 10-1.

In this embodiment, a charging cable unit is composed of the charging cable 800 formed in one body with the AC adapter 700 and a branch cable 800a and is branched so as to electrically connect the one AC adapter 700 fitted to the AC adapter fitting portion 23 of the first charging stand 10-1 to the contact pins 62 of each of the first charging stand 10-1 and the second charging stand 10-2.

A part of the branch cable 800a is accommodated in the cable accommodating portion 22 of the first charging stand 10-1.

Referring to FIG. 10, after the two connecting engaging protrusions 105 of the second charging stand 10-2 are engaged with the two connecting engaging recesses 104 of the first charging stand 10-1, a connecting plate 40 is fixed to rear surfaces of the first and the second charging stands 10-1 and 10-2 by four screws. Thus, the first charging stand 10-1 and the second charging stand 10-2 are fixed in a connected state.

The one AC adapter 700 is capable of supplying a charging voltage to two portable terminals. Therefore, as illustrated in FIGS. 11A to 11C, only one AC adapter is used for the combination charging stand. An output of the AC adapter 700 is supplied through the charging cable 800 and the branch cable 800a to the two charging stands, i.e., the first charging stand 10-1 and the second charging stand 10-2. The branch cable 800a has one connector to be connected to the plug of the charging cable 800 extending from the AC adapter 700, and two plugs similar to the plug of the AC adapter. The branch cable 800a is accommodated through the two cable guide members into the cable accommodating portion 22 of the first charging stand 10-1. The second charging stand 10-2 as a front charging stand is not equipped with the two guide members. In FIGS. 11A to 11C, illustration of an AC cord of the AC adapter 700 is cut off in the middle.

FIG. 12 is a right side view of a state where four combination charging stands according to the second embodiment are installed on a shelf board in a cabinet CT. The four combination charging stands accommodate the portable terminals 600, eight in total. As illustrated in FIG. 12, each of the shoulder straps of the eight portable terminals 600 is folded in multiple layers and accommodated in the shoulder strap accommodating portion of the charging stand to which it is mounted.

A space between the shelf board and a top board of the cabinet CT does not have a height sufficient to mount the portable terminals 600 from the upper side. However, since the terminal accommodating portion 11 (FIG. 11A) of each charging stand has a terminal-use cutout portion 118 (FIG. 11C), the portable terminal 600 can be mounted to and removed from the terminal accommodating portion 11 in a direction perpendicular to a drawing sheet plane in FIG. 12. Furthermore, since the shoulder strap accommodating portion 21 is formed on the same side as the terminal-use cutout portion 118 in the width direction W, the shoulder strap folded into multiple layers can be accommodated in a direction perpendicular to the drawing sheet plane in FIG. 12 after the portable terminal 600 is mounted to each charging stand. Therefore, it is possible to reduce the user's burden relating to the operation of adjusting the position of the shoulder strap. Furthermore, with the above-mentioned structure, it is possible to save a space in the height direction.

The above-mentioned charging stand according to the second embodiment is capable of reducing the user's burden relating to the operation of adjusting the position of the shoulder strap because the shoulder strap can be accommodated when the portable terminal equipped with the shoulder strap is mounted to the charging stand.

Third Embodiment

Next, referring to FIGS. 13A and 13B, FIGS. 14A to 14E, and FIG. 15, a third embodiment will be described.

A portable terminal charging stand according to the third embodiment is different from the charging stand according to the first embodiment in that the charging stand does not have the AC adapter fitting portion, the cable accommodating portion, the connecting engaging recesses, and the connecting engaging protrusions. Since the other structure is similar to that of the first embodiment, the drawings and the description of the first embodiment will be incorporated as necessary and detailed description thereof will be omitted.

Referring to FIGS. 13A and 13B, FIGS. 14A to 14E, and FIG. 15, the charging stand 10' according to the third embodiment comprises a base portion 10A', a terminal accommodating portion 11', and the shoulder strap accommodating portion 21.

The terminal accommodating portion 11' has a terminal-use cutout portion 118' formed at its one end (right end in this embodiment) of the base portion 10A' in the width direction W and adapted to insert and remove the portable terminal into and from the terminal accommodating portion 11'.

The shoulder strap accommodating portion 21 is formed behind the terminal accommodating portion 11' on the side of a right end as one end of the terminal accommodating portion 11' in the width direction W. The shoulder strap accommodating portion 21 has the strap-use cutout portion 218 formed at its one end in the width direction W and adapted to guide the shoulder strap out of and into the shoulder strap accommodating portion 21 in the width direction W.

The charging stand 10' according to the third embodiment is different from the charging stand 10 according to the first embodiment and does not have the two leg portions at the front part, the four leg portions at the rear part, the two connecting engaging recesses, and the two connecting engaging protrusions. The charging stand 10' is not used in combination but is used alone. Furthermore, the terminal accommodating portion 11' is not inclined and the portable terminal is accommodated in a vertical position. Furthermore, the terminal accommodating portion 11' does not have the fall-prevention protrusions and the drainage hole.

The above-mentioned charging stand according to the third embodiment is capable of accommodating the shoulder strap when the portable terminal equipped with the shoulder strap is mounted to the charging stand. It is therefore possible to reduce the user's burden relating to the operation of adjusting the position of the shoulder strap.

Fourth Embodiment

Next, referring to FIGS. 16A and 16B, FIGS. 17A to 17E, and FIG. 18, a fourth embodiment will be described.

A portable terminal charging stand according to the fourth embodiment is different from the charging stand according to the third embodiment in that the terminal accommodating portion does not have the terminal-use cutout portion. Since the other structure is similar to that of the third embodiment, the drawings and the description of the third embodiment will be incorporated as necessary and detailed description thereof will be omitted.

Referring to FIGS. 16A and 16B, FIGS. 17A to 17E, and FIG. 18, the charging stand 10" according to the fourth embodiment comprises a base portion 10A", a terminal accommodating portion 11", and the shoulder strap accommodating portion 21.

The terminal accommodating portion 11" is different from that of the third embodiment and does not have the terminal-use cutout portion for inserting and removing the portable terminal into and from the terminal accommodating portion 11" in the width direction W.

The shoulder strap accommodating portion 21 is formed behind the terminal accommodating portion 11" on the side of one end of the terminal accommodating portion 11" in the width direction W. The shoulder strap accommodating portion 21 has the strap-use cutout portion 218 formed at its one end in the width direction W and adapted to guide the shoulder strap out of and into the shoulder strap accommodating portion 21 in the width direction W.

The charging stand 10" according to the fourth embodiment is different from the third embodiment and does not have the terminal-use cutout portion for inserting and removing the portable terminal into and from the terminal accommodating portion 11". Therefore, the portable terminal is mounted only from the upper side.

The above-mentioned charging stand according to the fourth embodiment is capable of accommodating the shoulder strap when the portable terminal equipped with the shoulder strap is mounted to the charging stand. Therefore, it is possible to reduce the user's burden relating to the operation of adjusting the position of the shoulder strap.

It is noted that this invention is not limited to the first through the fourth embodiments described above.

For example, in the first and the second embodiments described above, the cable accommodating portion is provided on the left side behind the terminal accommodating portion whereas the shoulder strap accommodating portion is provided on the right side behind the terminal accommodating portion in a front view. Alternatively, the cable accommodating portion may be provided on the right side behind the terminal accommodating portion whereas the shoulder strap accommodating portion may be provided on the left side behind the terminal accommodating portion in a front view. In this case, the terminal-use cutout portion is formed on the left side behind the terminal accommodating portion. In this case, the left and the right shoulder strap fitting portions of the portable terminal are desirably reversed in position to right and left.

In the third and the fourth embodiments described above, the shoulder strap accommodating portion is provided on the right side behind the terminal accommodating portion in a front view. Alternatively, the shoulder strap accommodating portion may be provided on the left side behind the terminal accommodating portion in a front view. In this case, in the third embodiment, the terminal-use cutout portion is formed on the left side behind the terminal accommodating portion. In this case, the left and the right shoulder strap fitting portions of the portable terminal are desirably reversed in position to right and left.

This application is based upon and claims the benefit of priority from Japanese patent application No. 2018-031878, filed on Feb. 26, 2018, the disclosure of which is incorporated herein in its entirety by reference.

EXPLANATION OF REFERENCE NUMERALS 10, 10', 10" charging stand
10-1 first charging stand
10-2 second charging stand
10A, 10A', 10A" base portion
102, 103 leg portion
104 connecting engaging recess
105 connecting engaging protrusion
11, 11', 11" terminal accommodating portion
113 standing portion
115 fall-prevention protrusion
116 terminal guide protrusion
117 terminal receiving protrusion
118 terminal-use cutout portion
119 drainage hole
120 guide protrusion
218 strap-use cutout portion
22 cable accommodating portion 226 cable guide member
23 AC adapter fitting portion
236 adapter fixing band
62 contact pin
600 portable terminal
600d recess
602 touch panel display
662 charging and terminal-detecting contact terminal
671 hand belt
672 pad
680 shoulder strap
680h through hole
700 AC adapter
710 AC cord
800 charging cable
800a branch cable

What is claimed is:

1. A portable terminal charging stand for mounting a portable terminal equipped with a shoulder strap and for charging the portable terminal mounted thereon, the portable terminal charging stand comprising:
a base portion placed at an installation position;
a terminal accommodating portion formed on the base portion at a front side thereof, having a groove shape extending in a width direction of the base portion, and configured to accommodate a lower part of the portable terminal;
a shoulder strap accommodating portion formed on the base portion behind the terminal accommodating portion, having a groove shape extending in the width direction, and configured to accommodate at least a part of the shoulder strap of the portable terminal mounted to the terminal accommodating portion; and
a contact pin provided inside the terminal accommodating portion to be electrically connected to a charging contact terminal of the portable terminal accommodated in the terminal accommodating portion.

2. The charging stand according to claim 1, wherein the terminal accommodating portion has a terminal-use cutout portion formed at its one end in the width direction and adapted to insert and remove the portable terminal into and from the terminal accommodating portion in the width direction.

3. The charging stand according to claim 2, wherein the shoulder strap accommodating portion is formed behind the terminal accommodating portion on the side of the one end of the terminal accommodating portion.

4. The charging stand according to claim 3, wherein the shoulder strap accommodating portion has a strap-use cutout portion formed at its one end in the width direction and adapted to guide the shoulder strap into and out of the shoulder strap accommodating portion in the width direction.

5. The charging stand according to claim 1, further comprising an adapter fitting portion formed on the base portion behind the terminal accommodating portion and adapted to be fitted with an AC adapter for power supply through the contact pin to the portable terminal accommodated in the terminal accommodating portion.

6. The charging stand according to claim 5, further comprising an adapter fixing band configured to fix the AC adapter fitted to the AC adapter fitting portion.

7. The charging stand according to claim 5, further comprising a cable accommodating portion formed on the base portion behind the terminal accommodating portion, having a groove shape, and configured to accommodate a charging cable electrically connecting the contact pin and the AC adapter fitted to the AC adapter fitting portion.

8. The charging stand according to claim 7, wherein:
the shoulder strap accommodating portion is formed behind the terminal accommodating portion on the side of the one end of the terminal accommodating portion in the width direction,
the cable accommodating portion is formed behind the terminal accommodating portion on the side of the other end of the terminal accommodating portion in the width direction, and
the AC adapter fitting portion is formed behind the terminal accommodating portion between the shoulder strap accommodating portion and the cable accommodating portion.

9. The charging stand according to claim 7, which is configured to be removably connected to another charging stand having the same shape and the same size in a forward-backward direction of the base portion, the charging stand comprising:
an engaging recess formed on a front side of a lower part of the base portion; and
an engaging protrusion formed on a rear side of the lower part of the base portion and adapted to be removably engaged with the engaging recess of the another charging stand as an object to be connected, the engaging recess being removably engageable with the engaging protrusion of the another charging stand.

10. A combination charging stand comprising:
a first charging stand and a second charging stand each of which is the charging stand according to claim 9 and which are removably connected to each other in the forward-backward direction of the base portions;
the AC adapter; and
the charging cable;
the AC adapter having a power supply capacity enough to supply electric power to two or more portable terminals and fitted to the AC adapter fitting portion of the first charging stand;
the charging cable being branched to electrically connect the AC adapter fitted to the AC adapter fitting portion of the first charging stand to each of the contact pins of the first and the second charging stands;
the charging cable having a part accommodated in the cable accommodating portion of the first charging stand.

11. The charging stand according to claim 2, further comprising an adapter fitting portion formed on the base portion behind the terminal accommodating portion and adapted to be fitted with an AC adapter for power supply through the contact pin to the portable terminal accommodated in the terminal accommodating portion.

12. The charging stand according to claim 3, further comprising an adapter fitting portion formed on the base portion behind the terminal accommodating portion and adapted to be fitted with an AC adapter for power supply through the contact pin to the portable terminal accommodated in the terminal accommodating portion.

13. The charging stand according to claim 4, further comprising an adapter fitting portion formed on the base portion behind the terminal accommodating portion and adapted to be fitted with an AC adapter for power supply through the contact pin to the portable terminal accommodated in the terminal accommodating portion.

14. The charging stand according to claim 11, further comprising an adapter fixing band configured to fix the AC adapter fitted to the AC adapter fitting portion.

15. The charging stand according to claim 12, further comprising an adapter fixing band configured to fix the AC adapter fitted to the AC adapter fitting portion.

16. The charging stand according to claim 13, further comprising an adapter fixing band configured to fix the AC adapter fitted to the AC adapter fitting portion.

17. The charging stand according to claim 6, further comprising a cable accommodating portion formed on the base portion behind the terminal accommodating portion, having a groove shape, and configured to accommodate a charging cable electrically connecting the contact pin and the AC adapter fitted to the AC adapter fitting portion.

18. The charging stand according to claim 17, wherein:
the shoulder strap accommodating portion is formed behind the terminal accommodating portion on the side of the one end of the terminal accommodating portion in the width direction,
the cable accommodating portion is formed behind the terminal accommodating portion on the side of the other end of the terminal accommodating portion in the width direction, and
the AC adapter fitting portion is formed behind the terminal accommodating portion between the shoulder strap accommodating portion and the cable accommodating portion.

19. The charging stand according to claim 8, which is configured to be removably connected to another charging stand having the same shape and the same size in a forward-backward direction of the base portion, the charging stand comprising:

an engaging recess formed on a front side of a lower part of the base portion; and
an engaging protrusion formed on a rear side of the lower part of the base portion and adapted to be removably engaged with the engaging recess of the another charging stand as an object to be connected, the engaging recess being removably engageable with the engaging protrusion of the another charging stand.

20. A combination charging stand comprising:
a first charging stand and a second charging stand each of which is the charging stand according to claim 19 and which are removably connected to each other in the forward-backward direction of the base portions;
the AC adapter; and
the charging cable;
the AC adapter having a power supply capacity enough to supply electric power to two or more portable terminals and fitted to the AC adapter fitting portion of the first charging stand;
the charging cable being branched to electrically connect the AC adapter fitted to the AC adapter fitting portion of the first charging stand to each of the contact pins of the first and the second charging stands;
the charging cable having a part accommodated in the cable accommodating portion of the first charging stand.

\* \* \* \* \*